No. 768,393. PATENTED AUG. 23, 1904.
G. P. McARTHUR.
GATE VALVE.
APPLICATION FILED FEB. 17, 1903.
NO MODEL. 2 SHEETS—SHEET 2.
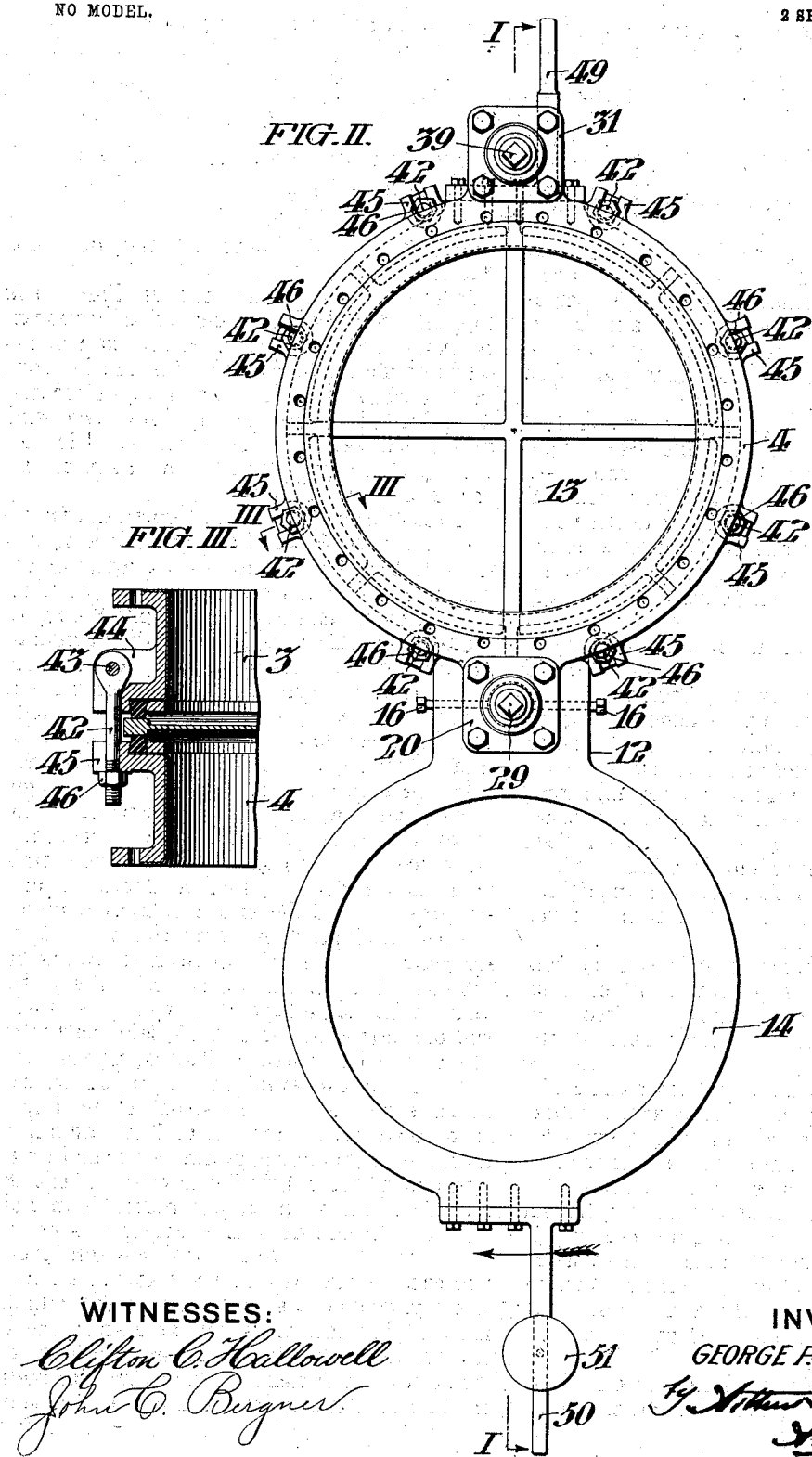
WITNESSES:
Clifton C. Hallowell
John C. Bergner
INVENTOR:
GEORGE P. McARTHUR,
by Arthur E. Paige
Atty No. 768,393. Patented August 23, 1904.

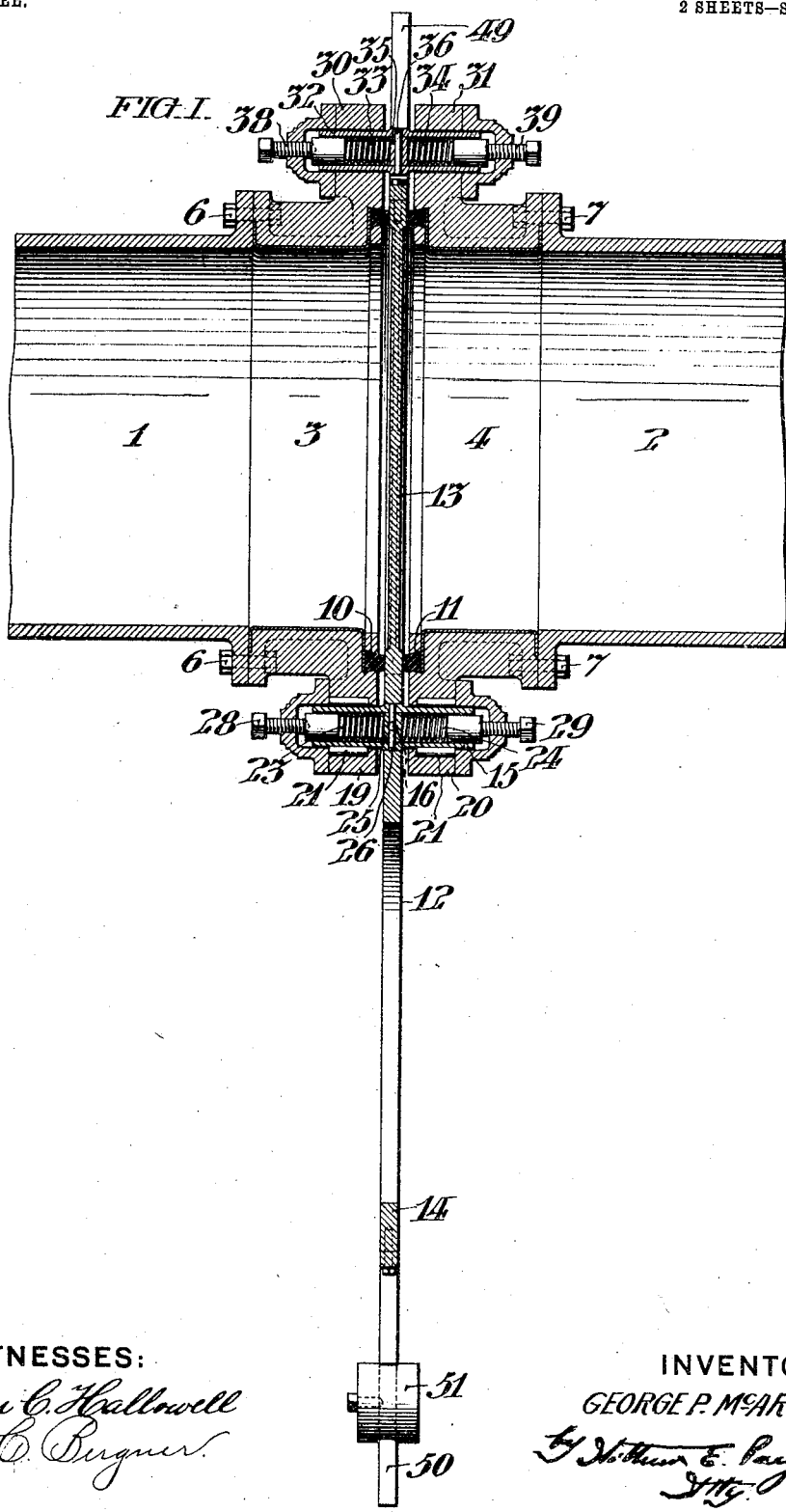

UNITED STATES PATENT OFFICE.

GEORGE P. McARTHUR, OF FOX CHASE, PENNSYLVANIA.

GATE-VALVE.

SPECIFICATION forming part of Letters Patent No. 768,393, dated August 23, 1904.

Application filed February 17, 1903. Serial No. 143,762. (No model.)

*To all whom it may concern:*

Be it known that I, GEORGE P. McARTHUR, of Fox Chase, Philadelphia county, Pennsylvania, have invented certain new and useful Improvements in Gate-Valves, whereof the following is a specification, reference being had to the accompanying drawings.

My improvements relate to gate-valves particularly adapted to control conduits of large diameter. In ordinary valves of this class the casing is a continuous structure extending from one side of the gate to the other and comprising opposed relatively fixed seats for the gate, and the latter requires powerful and consequently costly mechanism to shift it between said seats.

It is the object of my invention to lessen the cost of construction and operation of valves of this class by employing a casing which is not continuous upon opposite sides of the gate, but is divided in the plane of the gate to form separate opposed sections respectively provided with seats to engage the opposite faces of the gate, which sections are relatively adjustable in opposite directions coincident with the longitudinal axis of the conduit to seal and release the gate by relative movement of said casing-sections and without the aid of the mechanism aforesaid.

In the valve hereinafter described the separable casing-sections support between them an oscillatory gate comprising two diaphragms, one of which is imperforate and the other of which is perforate, and which are adapted to be alternately presented in registry with said casing-sections. Said valve also comprises springs to separate the casing-sections to release the gate and permit it to be shifted from one position to the other.

The construction contemplated is such that the conduit is opened to the atmosphere whenever the gate is manipulated; but this feature is not objectionable in controlling various classes of conduits, of which the vapor-conduits of multiple-effect evaporating-pans are typical.

My invention comprises the various novel features of construction and arrangement hereinafter more definitely specified and claimed.

In the accompanying drawings, Figure I is a longitudinal sectional view of an evaporating-pan vapor-conduit, showing a convenient embodiment of my invention arranged to control the same, section being taken on the line II in Fig. II. Fig. II is a right-hand end view of the valve shown in Fig. I. Fig. III is a fragmentary sectional view taken on the line III III in Fig. II.

In said figures, 1 and 2 are portions of a vapor-conduit to which the separate sections 3 and 4 of the valve-casing are respectively attached conveniently by bolts 6 7, connecting their meeting flanges. Said casing members 3 4 are respectively provided with gaskets 10 11, respectively, opposed to the opposite faces of the gate 12. Said gate comprises the imperforate diaphragm 13 and the perforate or annular diaphragm 14 and is mounted to oscillate upon the tubular shaft 15, which is fixed in the gate intermediate of said diaphragms by the set-screws 16. (Shown in Fig. II.) The opposite ends of said shaft 15 are respectively journaled in the brackets 19 20, projecting from the respective casing members 3 4, and are provided with bearing-rollers 21 to facilitate the oscillatory movement of the gate to alternately present said diaphragms in registry with the conduit. In order to separate the casing members 3 4, so as to permit the aforesaid oscillation of the gate 12, said shaft 15 is provided with springs 23 24, respectively, located on opposite sides of the abutment 25, which is secured in said shaft in the plane of the gate by the pin 26, and the effective pressure of said springs may be varied by adjustment of the respective screw-plungers 28 29, which are respectively mounted in the brackets 19 and 20. In order to produce a substantially uniform separating stress upon said casing-sections 3 and 4, they are respectively provided with brackets 30 31, which support the tubular shaft 32 diametrically opposite to the shaft 15, and said shaft 32 is provided with springs 33 34 on opposite sides of the abutment 35, which is secured in said shaft 32 in the plane of the gate by the pin 36. The effective pressure of said springs 33 34 may be varied by adjustment of the respective screw-plungers 38 39, which are respectively mounted in said brackets 30 31.

When the conduit is closed, as indicated in Fig. I, the two valve-casing sections 3 and 4 are drawn together, so as to compress and seal their respective gaskets 10 11 against the respectively opposite faces of the gate by means of the bolts 42, which, as indicated in Fig. III, are pivoted on bolts 43 in brackets 44, projecting from the casing-section 3, and are adapted to engage the brackets 45 upon the casing-section 4, being provided with nuts 46 to draw said sections together.

The opposite extremities of the gate 12 are respectively provided with handles 49 50, which facilitate the manipulation of the gate and serve to determine the proper position of the gate in either open or closed position, for when either the diaphragm 13 or the diaphragm 14 is in proper registry with the conduit one of said handles or the other is in contact with the shaft 32. As the imperforate diaphragm 13 is heavier than the perforate diaphragm 14, the handle 50 of the latter is conveniently provided with the weight 51 of such dimensions as to balance the gate.

The valve above described is operated as follows: It being desired to open the conduit, which is of course closed when the valve-gate 12 is in the position shown in Figs. I and II, the nuts 46 on the respective swing-bolts 42 are retracted, and said bolts are swung out to clear the plane of the gate. The screw-plungers 28, 29, 38, and 39 being properly set, the springs 23, 24, 33, and 34 thrust the sections 3 and 4 in opposite directions and separate them sufficiently to permit the gate to rotate freely with its shaft 15 upon the bearing-rollers 21. The perforate diaphragm 14 (shown at the bottom of Figs. I and II) is then upturned by the handle 50 until its opening is in registry with the conduit, which position is determined by the contact of the handle 50 with the side of the tubular shaft 32. The swing-bolts 42 are then returned to their initial position, and the casing-sections are drawn together to seal the gate between the gaskets 10 11 by rotation of the nuts 46.

It is to be understood that I do not desire to limit myself to the precise details of construction and arrangement herein set forth, as it is obvious that various modifications may be made therein without departing from the essential features of my invention.

I claim—

1. In a valve, the combination with a casing comprising relatively adjustable conduit-sections; of a gate mounted to oscillate between said sections; means to compress said sections upon said gate; and means normally tending to separate said sections, substantially as set forth.

2. In a valve, the combination with a casing comprising conduit-sections which are relatively adjustable; of a gate mounted to oscillate between said sections, comprising a closed diaphragm and an apertured diaphragm either of which can be brought between said sections; means normally tending to press said sections apart; and means to force said sections together, whereby either diaphragm can be tightly clamped between said sections, substantially as set forth.

3. In a valve, the combination with a casing comprising conduit-sections which are relatively adjustable; of a gate mounted to oscillate between said sections, comprising a closed diaphragm and an apertured diaphragm either of which can be brought between said sections; means on opposite sides of the gate normally tending to press said sections apart; and means to force said sections together, whereby either diaphragm can be tightly clamped between said sections, substantially as set forth.

4. In a valve, the combination with a casing comprising relatively adjustable conduit-sections; of a gate mounted to oscillate between said sections; means to adjustably separate said sections; comprising a tubular shaft, a center abutment in the plane of the gate, springs upon the respectively opposite sides of said abutment, and, plungers respectively opposed to said springs and carried by the respective casing-sections, substantially as set forth.

5. In a valve, the combination with a casing comprising relatively adjustable conduit-sections; of a gate mounted to oscillate between said sections; means to compress said sections upon said gate; and, means to separate said sections, comprising a spring, substantially as set forth.

6. In a valve, the combination with a casing comprising relatively adjustable conduit-sections; of a gate mounted to oscillate between said sections; a shaft upon which said gate oscillates; means associated with said shaft upon opposite sides of said gate tending to press said sections apart; and means to compress said sections upon said gate, substantially as set forth.

7. In a valve, the combination with a casing comprising relatively movable conduit-sections provided with bearings; of a gate provided with a shaft mounted to oscillate between said sections in said bearings; means normally tending to separate said sections and release the opposite faces of the gate; and means to force said sections respectively into contact with the opposite faces of the gate, substantially as set forth.

8. In a valve, the combination with a casing comprising relatively movable conduit-sections; of a gate mounted to oscillate between said sections; a tubular shaft fixed in said gate; bearings on the respective casing-sections for the respectively opposite extremities of said shaft; springs upon the respectively opposite sides of said gate opposed to the respective casing-sections and tending to separate them; and, means to compress said sections upon the respectively opposite faces of the gate, substantially as set forth.

9. In a valve, the combination with a casing comprising relatively movable conduit-sections; of a gate mounted to oscillate between said sections; a tubular shaft fixed in said gate; bearings on the respective casing-sections for the respectively opposite extremities of said shaft; a central abutment within said shaft; springs within said shaft upon the respectively opposite sides of said abutment, opposed to the respective casing-sections and tending to separate them; and, means to compress said sections upon the respectively opposite faces of the gate, substantially as set forth.

10. In a valve, the combination with a casing comprising relatively movable conduit-sections; of a gate mounted to oscillate between said sections; a tubular shaft fixed in said gate; bearings on the respective casing-sections for the respectively opposite extremities of said shaft; an abutment within said shaft in the plane of the gate; springs upon the respectively opposite sides of said abutment within said shaft; plungers carried by the respective casing-sections, opposed to said springs; means upon the respective casing-sections to adjust said plungers and thereby vary the stress of said springs; and, means to compress said sections upon said gate, comprising swing-bolts pivoted in one of said sections, and nuts adapted to engage the other of said sections, substantially as set forth.

11. In a valve, the combination with a casing comprising relatively adjustable conduit-sections; of a gate mounted to oscillate between said sections; means normally tending to separate said sections and release the opposite faces of the gate; and means to force said sections respectively into contact with the opposite faces of the gate comprising swing-bolts pivoted in one of said sections and arranged to adjustably engage the other of said sections, substantially as set forth.

In testimony whereof I have hereunto signed my name, at Philadelphia, in the State of Pennsylvania, this 30th day of January, 1903.

GEORGE P. McARTHUR.

Witnesses:
ARTHUR E. PAIGE,
E. L. FULLERTON.